(12) United States Patent
Pichler et al.

(10) Patent No.: US 12,372,992 B2
(45) Date of Patent: Jul. 29, 2025

(54) VOLTAGE LIMITER FOR AN RFID TAG

(71) Applicant: NXP B.V., Eindhoven (NL)

(72) Inventors: Thomas Pichler, Graz (AT); Ivan Jesus Rebollo Pimentel, Graz (AT)

(73) Assignee: NXP B.V., Eindhoven (NL)

( * ) Notice: Subject to any disclaimer, the term of this patent is extended or adjusted under 35 U.S.C. 154(b) by 379 days.

(21) Appl. No.: 18/298,005

(22) Filed: Apr. 10, 2023

(65) Prior Publication Data

US 2023/0359234 A1 Nov. 9, 2023

(30) Foreign Application Priority Data

May 5, 2022 (EP) .................................. 22171932

(51) Int. Cl.
- *G05F 1/575* (2006.01)
- *G05F 1/565* (2006.01)
- *G06K 7/00* (2006.01)
- *G06K 19/07* (2006.01)

(52) U.S. Cl.
CPC .............. *G05F 1/575* (2013.01); *G05F 1/565* (2013.01); *G06K 19/0715* (2013.01)

(58) Field of Classification Search
CPC ...... G06K 19/07; G06K 7/00; G06K 19/0715; G05F 1/565; G05F 1/575; H02H 9/04
See application file for complete search history.

(56) References Cited

U.S. PATENT DOCUMENTS

| | | | |
|---|---|---|---|
| 4,127,885 A | 11/1978 | Adam et al. | |
| 5,444,358 A | 8/1995 | Delepaut | |
| 5,465,188 A | 11/1995 | Pryor et al. | |
| 6,141,193 A | 10/2000 | Mercer | |
| 6,466,422 B2 | 10/2002 | Luo | |
| 6,580,257 B2 | 6/2003 | Marty | |
| 6,720,754 B2 | 4/2004 | Nakashimo | |
| 7,423,416 B1 | 9/2008 | Quinones et al. | |
| 7,602,161 B2 | 10/2009 | McLeod | |

(Continued)

FOREIGN PATENT DOCUMENTS

| EP | 3113082 A2 | 1/2017 |
|---|---|---|
| JP | 2013003699 A | 1/2013 |

OTHER PUBLICATIONS

Cantalice, Rafael et al.; "Non-Linear Shunt Regulator With RF Power Detector for RFID Applications"; 2020 IEEE International Conference on RFID (RFID); Sep. 28-Oct. 16, 2020, Orlando, Florida; DOI: 10.1109/RFID49298.2020.9244827.

(Continued)

*Primary Examiner* — Sisay G Tiku (57) ABSTRACT

A voltage limiter for a radio-frequency identification (RFID) integrated circuit (IC) for an RFID tag and a method for operating a voltage limiter is disclosed. The RFID IC includes a radio-frequency (RF) rectifier. The voltage limiter comprises: a current sink device coupled between an output of the RF rectifier and ground; a reference generator having an output for providing a reference voltage (Vlim) for controlling a current through the current sink device to limit a voltage (Vrec) at the output of the RF rectifier to values below a predefined voltage level; and feedback circuitry arranged to provide a feedback current to the reference generator to vary the reference voltage (Vlim), the feedback current being dependent on the current through the current sink device.

19 Claims, 6 Drawing Sheets

(56) References Cited

U.S. PATENT DOCUMENTS

| | | | | |
|---|---|---|---|---|
| 7,808,387 B1* | 10/2010 | Kuhn | ............... | G06K 19/0723 |
| | | | | 323/308 |
| 8,588,682 B2 | 11/2013 | Wilson | | |
| 9,197,059 B2 | 11/2015 | Wilson | | |
| 9,542,639 B1* | 1/2017 | Buescher | ........... | G06K 19/0709 |
| 10,551,860 B2 | 2/2020 | Yasusaka | | |
| 10,572,789 B1* | 2/2020 | Stanford | ............ | G06K 19/0709 |
| 2004/0239304 A1* | 12/2004 | Perez | .................... | G05F 1/575 |
| | | | | 323/316 |
| 2005/0133605 A1* | 6/2005 | Koyama | ............ | G06K 19/0723 |
| | | | | 235/492 |
| 2007/0206338 A1 | 9/2007 | Ishino | | |
| 2010/0097042 A1 | 4/2010 | Hsieh | | |
| 2012/0168520 A1* | 7/2012 | Finocchiaro | ............ | H01L 23/66 |
| | | | | 235/492 |
| 2012/0313592 A1* | 12/2012 | Ochoa | .................... | G05F 1/613 |
| | | | | 323/223 |
| 2014/0043003 A1* | 2/2014 | Lee | ........................ | G05F 1/10 |
| | | | | 323/283 |
| 2016/0004890 A1* | 1/2016 | Battista | .............. | G06K 7/10158 |
| | | | | 340/10.1 |
| 2016/0187900 A1 | 6/2016 | Dhiman et al. | | |
| 2016/0314389 A1 | 10/2016 | Han et al. | | |
| 2016/0314390 A1* | 10/2016 | Wu | .................... | G06K 19/0709 |
| 2023/0064494 A1 | 3/2023 | Pichler et al. | | |

OTHER PUBLICATIONS

Cheng, Yaping et al.; "A high-sensitivity current-shunt monitor with extended input common-mode voltage range"; 2017 2nd IEEE International Conference on Integrated Circuits and Microsystems (ICICM); Nov. 8-11, 1027, Nanjing, China; DOI: 10.1109/ICAM.2017.8242129.

Cortes, Fernando Paixao et al.; "A power management system architecture for LF passive RFID tags"; 2014 IEEE 5th Latin American Symposium on Circuits and Systems; Feb. 25-28, 2014, Santiago, Chile; DOI: 10.1109/LASCAS.2014.6820279.

* cited by examiner

VOLTAGE LIMITER FOR AN RFID TAG

CROSS-REFERENCE TO RELATED APPLICATIONS

This application claims priority under 35 U.S.C. § 119 to European Patent Application No. 22171932.1, filed on May 5, 2022, the contents of which are incorporated by reference herein.

FIELD OF THE DISCLOSURE

The present disclosure relates to a voltage limiter for an RFID tag. In particular, but not exclusively, it relates to a voltage limiter incorporated in a radio-frequency identification (RFID) integrated circuit (IC) for an RFID tag, for strongly limiting the voltage at the RFID IC at short distances to an RFID reader.

BACKGROUND OF THE DISCLOSURE

State of the art radio-frequency identification (RFID) tags need to deal with a huge input power range. Under high power conditions, when the tag is close to the reader, the integrated circuit (IC) of the RFID tag needs to be protected from physical damage. This is typically achieved by including limiter circuitry to limit the input amplitude to a certain maximum level, defined by the physical limitation of the IC process technology.

SUMMARY OF THE DISCLOSURE

Aspects of the disclosure are set out in the accompanying claims. Combinations of features from the dependent claims may be combined with features of the independent claims as appropriate and not merely as explicitly set out in the claims.

According to an aspect of the disclosure, there is provided a voltage limiter for a radio-frequency identification (RFID) integrated circuit (IC) for an RFID tag, the RFID IC including a radio-frequency (RF) rectifier, the voltage limiter comprising:
  a current sink device coupled between the output of the RF rectifier and ground;
  a reference generator having an output for providing a reference voltage for controlling a current through the current sink device to limit a voltage at the output of the RF rectifier to values below a predefined voltage level; and
  feedback circuitry arranged to provide a feedback current to the reference generator to vary the reference voltage, the feedback current being dependent on the current through the current sink device.

By including feedback circuitry arranged to provide a feedback current to the reference generator to vary the reference voltage, the feedback current being dependent on the current through the current sink device, the voltage limiter of the present disclosure can more strongly limit the power to the RFID IC under close-coupled conditions to the reader. This addresses a problem in known limiter circuitry of high-power dissipation through the limiter circuitry under near field (high power) conditions which still impacts the performance and lifetime of the RFID tag IC. By strongly limiting the power under close-coupled conditions to the reader, the voltage limiter of the present disclosure may thereby reduce physical damage to the tag IC. Furthermore, the voltage limiter of the present disclosure enables an anti-spy feature, to prevent intentional reading of the tag in the near field of the reader, thereby increasing privacy in these conditions. This feature guarantees that a tag must be a certain distance from a reader for the tag to be read by that reader, thereby restricting the operating range to a minimum distance.

In some embodiments, the reference voltage is dependent on the output voltage of the RF rectifier. In other embodiments the reference voltage has a predefined value.

The feedback current may be proportional to the current through the current sink device, for example a multiple or a submultiple of the current through the current sink device.

The feedback circuitry may comprise a current replica device coupled between the output of the RF rectifier and ground, in parallel with the current sink device.

The current replica device may be configured such that a current through the current replica device is dependent on the current through the current sink device. For example, the current through the current replica device may increase with increasing current through the current sink device. In some embodiments, the current through the current replica device is substantially proportional to the current through the current sink device, for example a multiple or submultiple. Providing a current replica branch in addition to the current sink branch, avoids the need to have a diode to mirror the current in the current sink branch, which would limit the sinking capability of the current sink device. For example, if a current mirror were present in the current sink branch, the voltage Vds between the current terminals of the current sink device would be reduced by the voltage Vds between the current terminals of the current mirror. Also, the current replica device provides an additional multiplication (division) ratio between the feedback current and the current in the current sink device, ultimately reducing the area of the voltage limiter.

A control terminal of the current replica device may be coupled to the control terminal of the current sink device.

The current replica device may be configured to replicate a multiple or submultiple of the current in the current sink device.

The feedback circuitry may further comprise at least one current mirror for copying the current in the current replica device.

By copying or mirroring a current in the current replica branch, the current mirror device does not limit the sinking capability of the current sink device.

At least one current mirror may comprise a current mirror device coupled in series with the current replica device.

That is, a current terminal of the current mirror device may be coupled to a current terminal of the current replica device, the other current terminal of the current mirror device being coupled to one of ground or the output of the RF rectifier.

At least one current mirror may comprise a current mirror device and a current copy device, the current copy device having a control terminal coupled to a control terminal of the current mirror device, a first current terminal coupled to a current terminal of the current mirror device, and a second current terminal coupled to the control terminal of the current sink device.

A current in said current copy device may be proportional to a current in said current replica device.

Said at least one current mirror may be configured to mirror a multiple or submultiple of the current in the current replica device.

Said at least one current mirror may comprise a first current mirror for copying the current in the current replica device, and a further current mirror for copying the current in the first current mirror.

The inclusion of multiple current mirrors in the feedback circuitry may facilitate different ratios between the feedback current and the current in the current sink device, and/or may facilitate providing the feedback current to different circuitry points of the voltage limiter.

The feedback circuitry may be configured to provide the feedback current to a control terminal of the current sink device.

The feedback circuitry may be configured to provide the feedback current to a feedback node of the reference generator, wherein a voltage offset is generated between the feedback node and the control terminal of the current sink device.

This feature may be used to cause the supply voltage to be reduced to a particular voltage level when the rf power is high. For example, the voltage may be reduced to a level at which read and write to the tag is not possible. As another example, the voltage may be reduced to a level which allows read operations only, but no write operations (as a typical example, read functionality requires a minimum of around 0.5V, while write functionality requires a minimum of around 0.0V). This feature may also allow the current sink device to be smaller, by causing it to sink less current at high rf powers.

The feedback circuitry may comprise an element coupled between the feedback node and the control terminal of the current sink device for generating the voltage offset, the element being a resistor, a diode, a bipolar transistor, or a MOS transistor.

In some embodiments, the current sink device is a main current sink device, the voltage limiter further comprising:
  an additional current sink device coupled between the output of the RF rectifier and the ground, in parallel with the main current sink device; and
  a sensing device for sensing current through the main current sink device and for turning on the additional current sink device when a current flow in the main current sink device exceeds a predetermined level.

By turning on the additional current sink device when current flows in the main current sink device, the supply voltage is reduced to a fixed voltage level when the rf power is high. This prevents the reduced supply voltage from gradually rising as proximity to an RF reader increases further, since higher RF field amplitudes might otherwise raise the supply voltage sufficiently to actuate the RFID IC. The value of the fixed voltage level may be selected through the choice of device type for the sense device and additional current sink.

The main sink device and the additional sink device may be transistors having opposite polarity.

The sensing device may comprise at least one of an inverter, a Schmitt trigger, a latch, and/or an amplifier which may feature a hysteresis.

The voltage limiter may further comprise:
  a current pull device coupled between the control terminal of the main current sink device and ground; and
  a sensing device for sensing current through the main current sink device and for turning on the current pull device when current flows in the main current sink device.

By turning on the current pull device when current flows in the main current sink device, the supply voltage is reduced more rapidly as a function of increasing current, due to clamping the control terminal of the current sink device. Another advantage is that this arrangement allows the sensing device and current pull device to be very small.

The sensing device may comprise at least one of an inverter, a Schmitt trigger, a latch, and/or an amplifier. The sensing device may feature a hysteresis.

In some embodiments, the current sink device is a main current sink device, the voltage limiter further comprising:
  an additional current sink device coupled between the output of the voltage rectifier and the ground, in parallel with the main current sink device;
  a current pull device coupled between the control terminal of the main current sink device and ground; and
  and
  a sensing device for sensing current through the main current sink device and for turning on the additional current sink device and the current pull device when current flows in the main current sink device.

The sensing device may comprise at least one of an inverter, a Schmitt trigger, a latch, and/or an amplifier. The sensing device may feature a hysteresis.

The current sink device may be a transistor having a first polarity, the transistor comprising a control terminal coupled to the output of the reference generator.

The current replica device may be a transistor having said first polarity.

The at least one current mirror may comprise a current mirror having a second polarity opposite to said first polarity.

According to another aspect of the disclosure, there is provided a radio-frequency identification (RFID) integrated circuit (IC) for an RFID tag, the RFID IC comprising:
  a radio-frequency (RF) rectifier; and
  a voltage limiter according to the preceding aspect of the disclosure.

According to another aspect of the disclosure, there is provided a method for operating a voltage limiter in a radio-frequency identification (RFID) integrated circuit (IC) for an RFID tag, the RFID IC including a radio-frequency (RF) rectifier, the method comprising:
  sinking a current from the output of the RF rectifier to ground;
  providing a reference voltage for controlling the current to limit a voltage at the output of the RF rectifier to values below a predefined voltage level; and
  providing a feedback current to vary the reference voltage, the feedback current being dependent on the current.

BRIEF DESCRIPTION OF THE DRAWINGS

Example embodiments of the present disclosure will be described, by way of example only, with reference to the accompanying drawings in which like reference signs relate to like elements and in which.

DETAILED DESCRIPTION

Figure 1A:
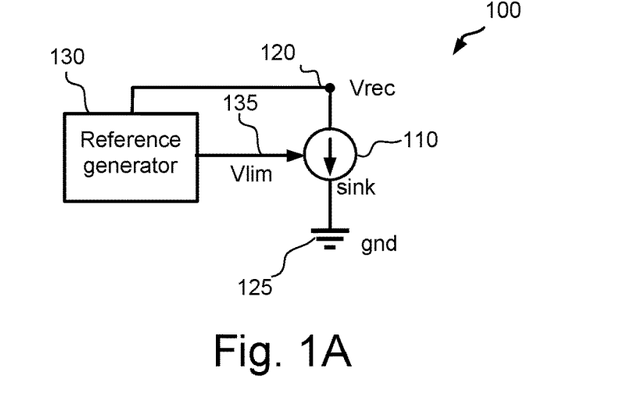
FIG. 1A schematically illustrates a voltage limiter for an RFID IC useful for understanding the present disclosure.

FIG. 1A represents a typical voltage limiter 100, useful for understanding the present invention, the voltage limiter 100 for a radio-frequency identification (RFID) IC of an RFID tag. The RFID IC includes a radio-frequency (RF) rectifier (not shown) configured to convert an AC signal received from an antenna (not shown) incorporated in the RFID tag to a DC signal. The voltage limiter 100 includes a current sink device 110 coupled between the output (Vrec) 120 of the RF rectifier and a reference or ground potential (gnd) 125, and a reference generator 130 for generating a reference voltage (Vlim) 135 for controlling a current through the current sink device 110 to limit the output voltage of the RF rectifier to a predefined level.

Figure 1B:
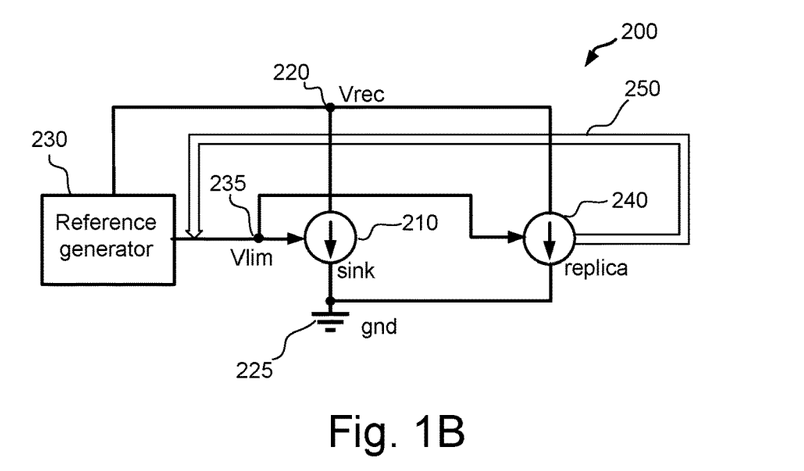
FIG. 1B schematically illustrates a circuit for a voltage limiter for an RFID IC in accordance with a first example embodiment of the present disclosure.

FIG. 1B conceptually illustrates a voltage limiter 200 according to a first example embodiment of the present disclosure. The voltage limiter 200 may be incorporated in an RFID IC of an RFID tag. The RFID tag typically includes electronic components to allow the RFID tag to communicate with an external RFID reader, including an RF rectifier (not shown) for generating a DC voltage (Vrec) 230 from an AC signal received from a reader (not shown) through an RFID tag antenna (not shown). The voltage limiter 200 includes a current sink device 210 coupled between the output (Vrec) 220 of the RF rectifier and a reference or ground potential (gnd) 225. The voltage limiter 200 also includes a reference generator 230 having an output 235 for providing a reference voltage Vlim to the control terminal of the current sink device 210, for controlling a current through the current sink device 210 to limit the output voltage of the RF rectifier Vrec 220 to a predefined voltage level. The reference voltage Vlim 235 may be derived by the reference generator 230 from the voltage Vrec 220 output by the RF rectifier. The current sink device 210 begins to conduct when the output voltage 220 of the RF rectifier exceeds a predetermined value. The reference generator 230 may have a limited driving capability. In contrast to the voltage limiter 100 of FIG. 1A, the voltage limiter 200 of this example embodiment also includes feedback circuitry 240, 250 arranged to provide a feedback current to the reference generator 230 to vary the reference voltage Vlim 235 output by the reference generator 230, the feedback current being dependent on the current through the current sink device 210. The feedback circuitry 240, 250 includes a current replica device 240, coupled between the output (Vrec) 220 of the RF rectifier and the ground potential 225, in parallel with the current sink device 210. The control terminals of the current sink device 210 and the current replica device 240 are connected to each other. A current through the replica current device 240 is proportional to the current through the current sink device 210, for example a multiple or a sub-multiple of it. The feedback circuitry 240, 250 further comprises elements (represented by path 250) for mirroring and copying the current in the replica current device 240, for example as a multiple or a sub-multiple of it. The copied current is connected (sinking or sourcing) to the reference generator 230 to pull current from the reference voltage Vlim in order to influence the voltage Vlim at the output 235 of the reference generator. The feedback circuitry 240, 250 thereby provides positive feedback to the reference voltage Vlim 236, the feedback current increasing as the current through the current sink device 210 increases.

Figure 2:
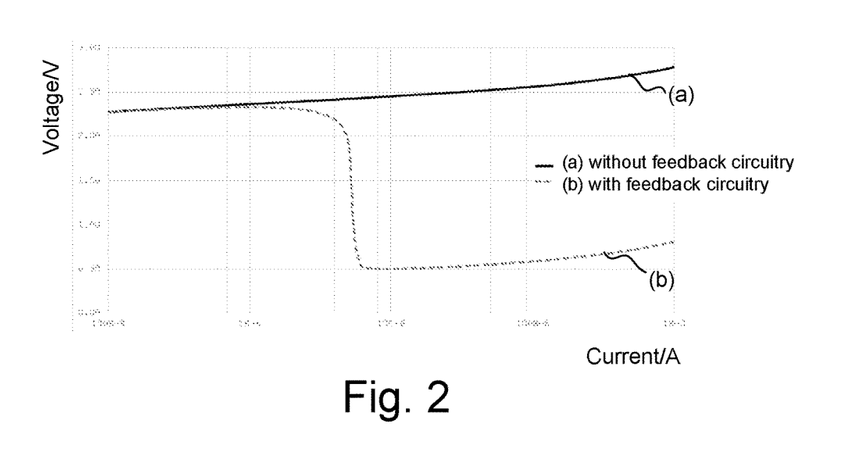
FIG. 2 shows a graph of input voltage against current sunk illustrating the behaviour of a typical voltage limiter and the voltage limiter according to the first example embodiment of the present disclosure.

FIG. 2 shows a graph illustrating the behaviour of the voltage limiter 200 of the present disclosure and a typical voltage limiter 100. The dashed line (b) of FIG. 2 shows the voltage Vrec 220 output by the RF rectifier of the RFID tag as a function of the current through the current sink device 210, for the voltage limiter 200 of the first example embodiment described above with reference to FIG. 1B. For comparison, the solid line (a) of FIG. 2 illustrates the corresponding voltage-current characteristics for a typical voltage limiter without the feedback circuitry described in the present disclosure, such as the voltage limiter 100 shown in FIG. 1A.

In FIG. 2, increasing current corresponds to increasing RF field strength due to increasing proximity to an RF reader. In general, known voltage limiters act to limit the voltage to a pre-determined level as the current increases. Accordingly, the solid line (a) shown in FIG. 2 is relatively flat. In contrast, the voltage limiter 200 of the present disclosure acts to strongly limit the voltage above a specified RF field strength, corresponding to a specified distance to the reader. As can be seen in FIG. 2, the voltage is at a relatively constant level of around 2.3 volts for currents below about 1 E-06 amps. As the current increases, corresponding to decreasing distance of the RFID tag from the RF reader, the voltage is sharply pulled down and thereafter remains at a significantly reduced level. In the specific example illustrated in FIG. 2, this sharp decrease occurs between about 4E-6 and 5E-06A, and the voltage is reduced from about 2.3 V to about 0.5 volts. This reduced voltage may gradually increase with further increases to the current, but remains substantially reduced, for example remaining significantly below 1 V.

The effect of the feedback current in the voltage limiter 200 is thus to automatically reduce the DC voltage supply for the RF tag IC below a predetermined voltage level, for RF field strengths above a predetermined value. The level to which the voltage is reduced is dependent on the size of the devices, in particular the current sink device. As a result, certain functionality of the RFID tag is disabled and can therefore only be used at greater distances from the reader. For example, the supply voltage may be reduced below the level at which the memory cannot be written, or even below the level at which the IC cannot be operated. For example, by limiting the supply voltage to below about 1 volt, both read and write functionality are typically disabled. Some or all operations of the tag may therefore be restricted to be performed only above a minimum distance to the reader. Since this feature is not controlled by a digital signal, but by limiting power to the RFID IC, security may be improved.

Reducing the voltage to the RFID tag IC at high RF powers may also prevent physical damage to the RFID tag IC. This includes reduced self-heating (thermal protection), which in turn reduces the required voltage limiter device size (area improvement) and reduces the parasitic input cap due to the reduced device size (performance improvement). Temperature sensitive applications/products are not disturbed. Power is not burned in the voltage limiter and therefore can be used by other labels in a population (power sharing).

Figure 3A:
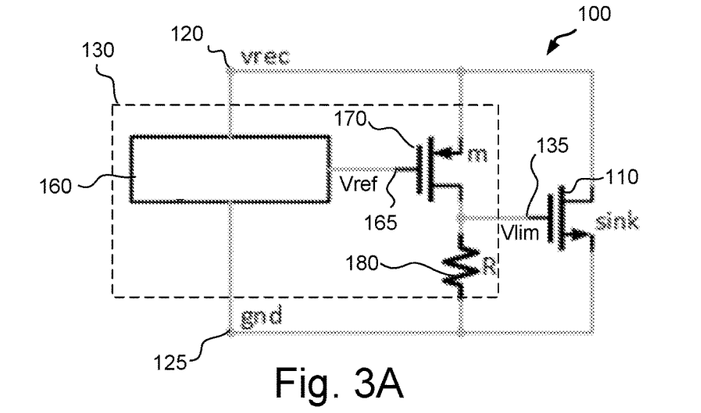
FIG. 3A illustrates a circuit for a voltage limiter useful for understanding the present disclosure.
Figure 3B:
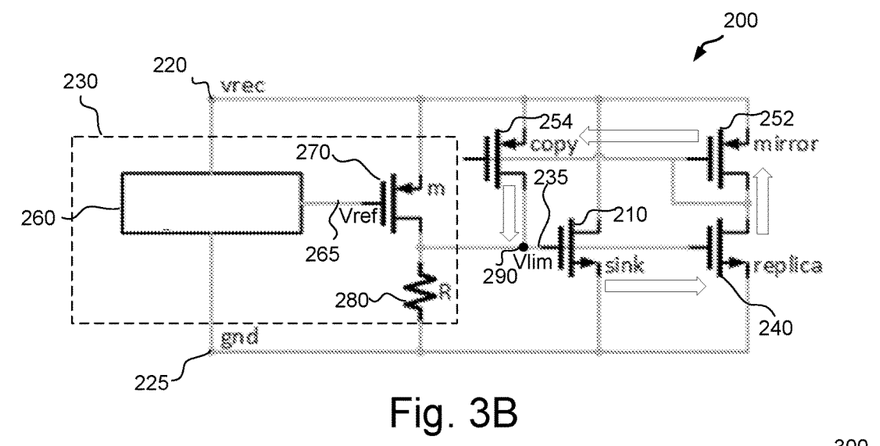
FIG. 3B illustrates a circuit for a voltage limiter in accordance with a second example embodiment of the present disclosure.
Figure 3C:
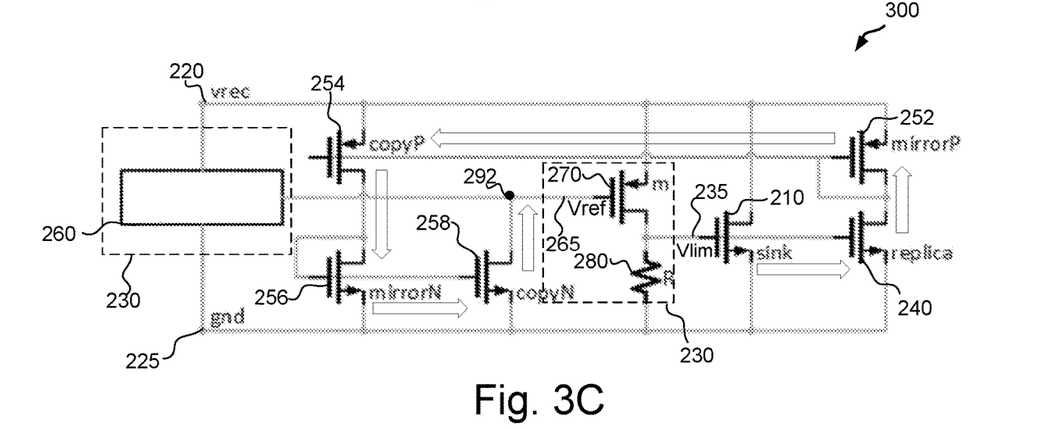
FIG. 3C illustrates a circuit for a voltage limiter in accordance with a third example embodiment of the present disclosure.

FIGS. 3B and 3C schematically illustrate circuits for a voltage limiter 200 according to second and third respective example embodiments. For comparison, FIG. 3A illustrates a circuit for a voltage limiter 100, without the feedback circuitry of the present disclosure, useful for understanding the present disclosure.

Accordingly, FIG. 3A shows a voltage limiter 100 including a current sink device 110 in the form of an NMOS transistor coupled between the output Vrec 120 of the rectifier of the RFID tag, and a ground reference 125. A reference generator 130 comprises a voltage reference 160 for outputting a voltage Vref 165 dependent upon the rectifier output voltage Vrec, and further comprises a transistor 170 and a resistor 180 coupled in series between the output Vrec 120 of the rectifier and ground 125. The control terminal of the transistor 170 is controlled by the voltage Vref 165. A reference voltage Vlim 135 for controlling the current sink device 110 is generated at the connection point between the transistor 170 and resistor 180, which is coupled to the control terminal of current sink device 110.

FIG. 3B illustrates a voltage limiter 200 according to a second example embodiment of the present invention. The voltage limiter 200 includes a current sink device 210, in the form of an NMOS transistor, coupled between the output (Vrec) 220 of the RF rectifier and a reference or ground potential (gnd) 225. A reference generator 230 has an output 235 providing a reference voltage Vlim 235 which is input to the control terminal (in this embodiment, the gate terminal) of the current sink device 210 for controlling a current through the current sink device 210 to limit the output voltage of the RF rectifier to a predefined voltage level. The reference generator 230 comprises a voltage reference 260 for outputting a voltage Vref 265 dependent upon the rectifier output voltage Vrec, and further comprises a transistor m, 270, in the form of a PMOS transistor, and a resistor R, 280 coupled in series between the output Vrec 220 of the rectifier and ground 225. The control terminal (in this embodiment, the gate terminal) of the transistor 270 is controlled by the voltage Vref 165 output by the voltage reference. The reference voltage Vlim 235 for controlling the current sink device 210 is generated at the connection between the transistor 270 and resistor 280, this connection point being coupled to the control terminal of current sink device 210. In this embodiment, the reference voltage Vlim increases with the output voltage 220 of the RF rectifier. The current sink device 210 sinks current when the reference voltage Vlim 235 exceeds a predetermined value, in this case the threshold voltage of the current sink device 210.

The voltage limiter 200 of FIG. 3B embodiment also includes feedback circuitry 240, 252, 254 arranged to provide a feedback current to the reference generator 230 to vary the reference voltage Vlim 235 output by the reference generator 230 for controlling the current through the current sink device 210, the feedback current being dependent on the current through the current sink device 210.

The feedback circuitry 240, 252, 254 includes a current replica device 240, a current mirror device 252 and a current copy device 254. The current replica device 252, in the form of a NMOS transistor, is coupled in parallel with the current sink device 210, between the output (Vrec) 220 of the RF rectifier and the reference or ground potential 225. The control terminal of the current replica device 240 is connected to the control terminal of the current sink device 210. A current through the current replica device 240 may be proportional to the current through the current sink device 210, for example a multiple or a sub-multiple of it. The current mirror device 252 and a current copy device 254 together form a current mirror for copying the current in the current replica device 240 (for example a multiple or sub-multiple of it). The current mirror device 252, in the form of a PMOS transistor, is coupled in series with the current replica device 240, between the output Vrec 220 of the RF rectifier and the current replica device 240. The source terminal of the current mirror device 252 is coupled to Vrec 220, while the gate and drain terminals of the current mirror device 252 are connected to each other and are coupled to the drain terminal of the current replica device 240. The copy current device 254, in the form of a PMOS transistor, is coupled between the output Vrec 220 of the RF rectifier and the control terminal of the current sink device 210. That is, the source terminal of the current copy device 254 is coupled to the Vrec 220, the drain terminal of the current copy device 254 is coupled to control terminal of the current sink device 210. The control terminal of the copy current device 254 is connected to the control terminal of the current mirror device 252. The current through the current copy device 254 is therefore a copy (e.g. a multiple or submultiple) of the current in the current replica device 240, which is itself a copy (e.g. a multiple or submultiple) of the current in the current sink device 210. The copied current, i.e. the current through the current copy device 252, is fed back to the reference generator 230 at a feedback node 290. In this example embodiment, the feedback node 290 is connected to the control terminal of the current sink device 210. However, the feedback current may be provided at other circuitry points, as will be illustrated in other example embodiments. The unfilled arrows in FIG. 3B indicate the function of the feedback circuitry 240, 252, 254 in successively copying the current in the current sink device 210 to the current replica device 240, the current mirror device 252, and the current copy device 254 in order to provide, at feedback node 290, a feedback current which increases with increasing current in the current sink device 210. In this embodiment, the additional feedback current supplied at the feedback node 290 increases Vlim, causing the current sink device 210 to conduct more strongly, reducing the voltage Vrec.

FIG. 3C illustrates a voltage limiter 300 according to a third example embodiment of the present invention. The voltage limiter 300 differs from the voltage limiter 200 of FIG. 3B in that the feedback circuitry 240, 252, 254, 256, 285 comprises a further current mirror 256, 258, for copying the current in the first current mirror 252, 254, and the feedback current is fed back to a feedback node 292 corresponding to a different circuitry point. The feedback node 292 is connected to the output Vref of the voltage reference 260 and the control terminal of the transistor 270. The further current mirror 256, 258 comprises a further current mirror device 256 and a further current copy device 258, in the form of NMOS based transistors. The first current copy device 254 and the further current mirror device 256 are coupled in series between the rectifier output Vrec 220 and ground 225, the drain of the first current copy device 254 being coupled to the drain of the further current mirror device 256, and the source of the further current mirror device 256 being coupled to ground 225. The further current copy device 258 is coupled between the feedback node 292 and ground 225. The control terminals (gate terminals) of the further current mirror device and the further current copy device are connected to each other and to the drain of the further current mirror device 256. Including multiple current mirrors may facilitate different ratios between the feedback current and the current in the current sink device. The feedback current at feedback node 292 influences the current through transistor 270, thereby influencing the voltage Vlim 235 at the control terminal of the current sink device 210. Compared with the example embodiment of FIG. 3B, the location of feedback node 292 in the example embodiment of FIG. 3C enables the sizes of the devices to be reduced, resulting in an area benefit, and to have a faster response.

Figure 4:
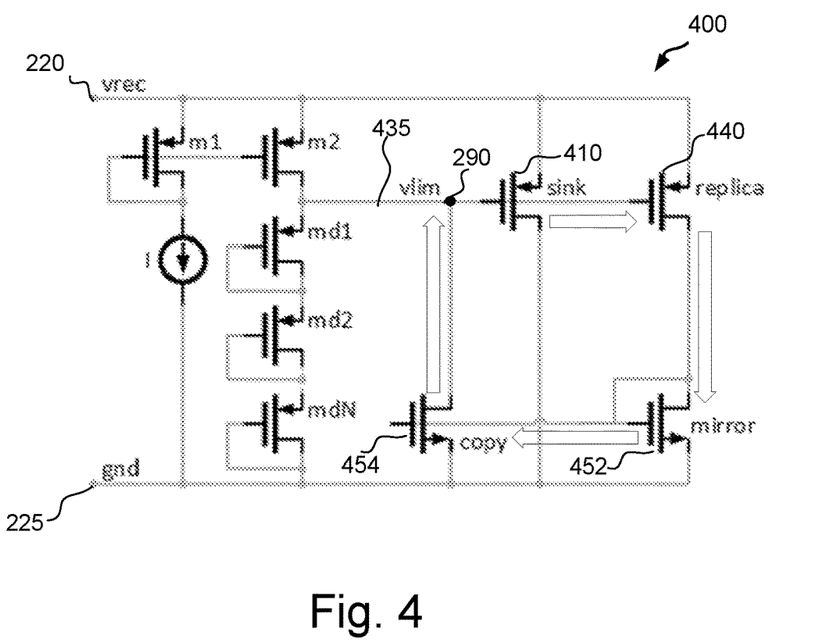
FIG. 4 illustrates a circuit for a voltage limiter in accordance with a fourth example embodiment of the present disclosure.

FIG. 4 illustrates a voltage limiter 400 according to a fourth example embodiment. Voltage limiters according to the present disclosure may be based on voltage generation architecture comprising a current sink or current source into or from a diode (or multiple diodes). In FIG. 4, a PMOS transistor m1 is coupled in series with a current sink I between Vrec 220 and ground 225. The current through the transistor m1 is mirrored in a second PMOS transistor m2, the source terminal of which is coupled to Vrec 220, the drain terminal of which is coupled via multiple series-connected diodes md1, md2, mdN to ground 225. A reference voltage Vlim 435 is generated at the connection point between the transistor m2 and the closest diode md1. The current sink device 410 of this embodiment is provided by a PMOS transistor coupled between Vrec 220 and ground 225. The reference voltage Vlim 435 is coupled to the control terminal of current sink device 410. The current sink device 410 sinks current when the difference between the output voltage 220 of the RF rectifier and the reference voltage Vlim exceeds a predetermined value, in this case the threshold voltage of the current sink device 410. The voltage limiter 400 of FIG. 4 also includes feedback circuitry comprising a current replica device 440, a current mirror device 452 and a current copy device 454, arranged to provide a feedback current to feedback node 290 to vary the reference voltage Vlim 435 output by the reference generator for controlling the current through the current sink device 410. Each of the current sink device 410, the current replica device 440, the current mirror device 452 and the current copy device 454 has opposite polarity compared to the corresponding elements of the voltage limiter 200 of FIGS. 3B and 3C. The current sink device 410 and the current replica device 440 are PMOS transistors, while the current mirror device 452 and the current copy device 454 forming the current mirror are NMOS transistors.

The maximum current at which the output voltage 220 of the RF rectifier is modified is determined, at least in part, by the driving capability of the reference generator, the current replica ratio and current copy ratio. For example: Iref·nsink·ncopy @vdda~vth_sink (vgs~vds), where Iref is the driving capability of the reference generator, nsink is the ratio between the current through the current replica device and the current through the current sink device, ncopy is the ratio between the copied current and the current through the current replica device, vth_sink is the threshold voltage of the current sink device. Referring to FIG. 4, that is, once the current in the current copy device 454 is more than can be sourced from the transistor m2, vlim drops, resulting in an increased current though the current sink device 410 and a drop in the voltage vrec output by the RF rectifier.

Figure 5:
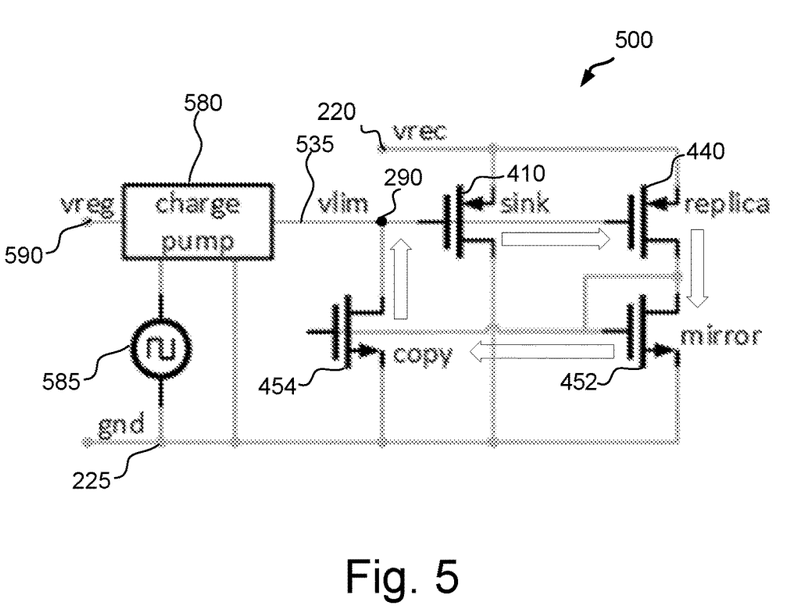
FIG. 5 illustrates a circuit for a voltage limiter in accordance with a fifth example embodiment of the present disclosure.

FIG. 5 illustrates a voltage limiter 500 according to a fifth example embodiment. The voltage limiter 500 differs from the voltage limiter 400 of FIG. 4 in that the reference voltage is based on voltage generation architecture which uses a charge pump with limited driving capability. In FIG. 5, the reference voltage Vlim 535 is generated by a charge pump device 580 coupled to a clock generator 585 and referenced to the ground potential 225. The charge pump device 580 generates the reference voltage Vlim 535 based on a regulated voltage Vreg 590.

Figure 6A:
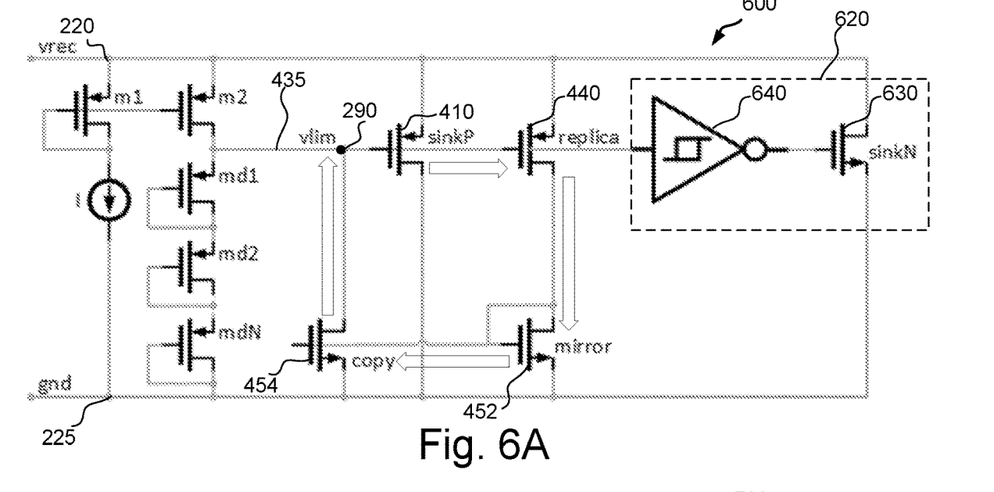
FIG. 6A schematically illustrates a circuit for a voltage limiter in accordance with a sixth example embodiment of the present disclosure.
Figure 6B:
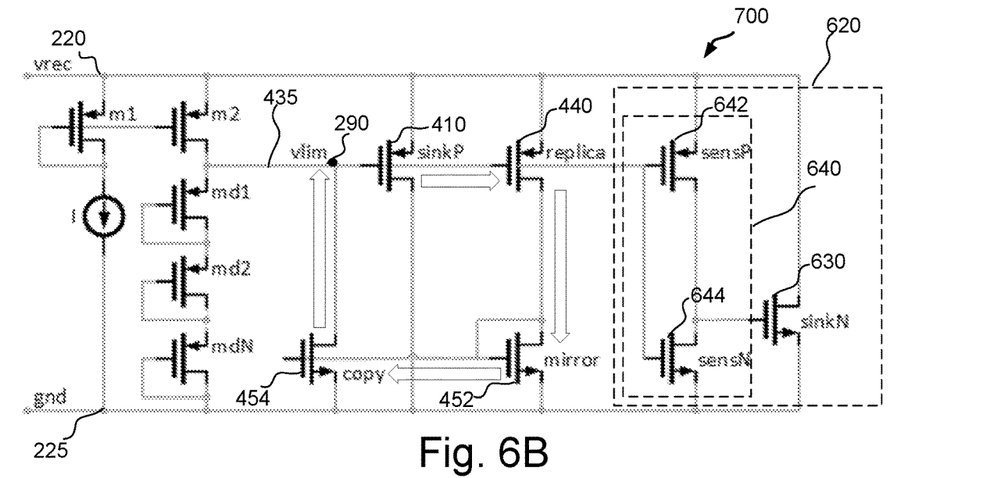
FIG. 6B illustrates a circuit for a voltage limiter in accordance with a seventh example embodiment of the present disclosure.
Figure 7:
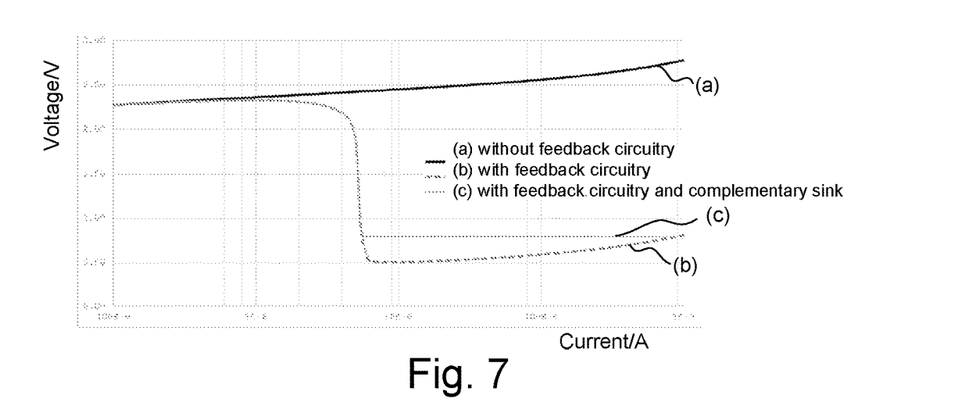
FIG. 7 shows a graph of input voltage against current sunk illustrating the behaviour of a typical voltage limiter and the voltage limiter according to the sixth and seventh example embodiments.

FIGS. 6A and 6B illustrate a voltage limiter 600, 700 according to sixth and seventh example embodiments respectively. The voltage limiters 600, 700 differ from the voltage limiter 400 of FIG. 4 in that the feedback circuitry further comprises an additional or complementary current sink device 630, in the form of an NMOS transistor, coupled between Vrec 220 and ground 225, in parallel with the main current sink device 410, and a sensing device or sensing gate 640 for sensing current through the main current sink device 410 controlling the additional current sink device 630 and for turning on the additional current sink device 630 when current flows in the main current sink device 410. The polarity of the complementary current sink device 630 is opposite to that of the current sink device 410. The current through the current sink device 410 depends on the voltage Vlim 435 at the control terminal of the current sink device 410. Accordingly, the input of the sensing gate 640 is connected to the control terminal (gate) of the current sink device 410. The output of the sensing gate 640 is connected to the control terminal of the complementary current sink device 630. The sensing gate may be an inverter, a Schmitt trigger, a latch, an amplifier, and/or any other simple, complex or compound gate, sequential or combinational. In the voltage limiter 600 of FIG. 6, the sensing gate 640 is an inverting Schmitt trigger. In FIG. 7, the sensing gate 640 is a MOS inverter comprising a PMOS transistor 642 and an NMOS transistor 644, their control terminals being coupled to the control terminal of the current sink device 410, their sources being coupled to Vrec 220 and ground 225 respectively, their drains both being coupled to the control terminal of the complementary current sink device 630.

FIG. 7 shows a graph illustrating the behaviour of the voltage limiters 600 and 700 of FIGS. 6A and 6B, compared with that of the voltage limiter 400 of FIG. 4 and a typical voltage limiter 100. The upper solid line (a) shows the voltage-current characteristics for a typical voltage limiter 100 without the feedback circuitry of the present disclosure. The dashed line (b) shows the voltage Vrec 220 output by the RF rectifier of the RFID tag as a function of the current through the current sink device 410, for the voltage limiter 400 of the fourth example embodiment described above with reference to FIG. 4. The behaviour of the voltage limiter 400 is the same as that described with respect to curve (b) of FIG. 2. The lower solid line (c) shows the voltage Vrec 220 as a function of the current through the current sink device 410, for the voltage limiters 600 and 700 of the sixth and seventh example embodiments described above with reference to FIGS. 6A and 6B. The effect of the complementary current sink device 630 in the voltage limiters 600 and 700 of FIGS. 6A and 6B is to further flatten the I/V behaviour, causing the reduced voltage (i.e. for currents above around 10E-6 A in FIG. 7) to remain constant, at a value determined at least in part by the parameters of the complementary current sink device 630, rather than gradually increasing as for the voltage limiter 400 without the complementary sink device 630. The complementary current sink device 630 effectively prevents any rise in voltage with increasing current (i.e. increasing proximity to the reader) which could power on the RFID tag.

Figure 8A:
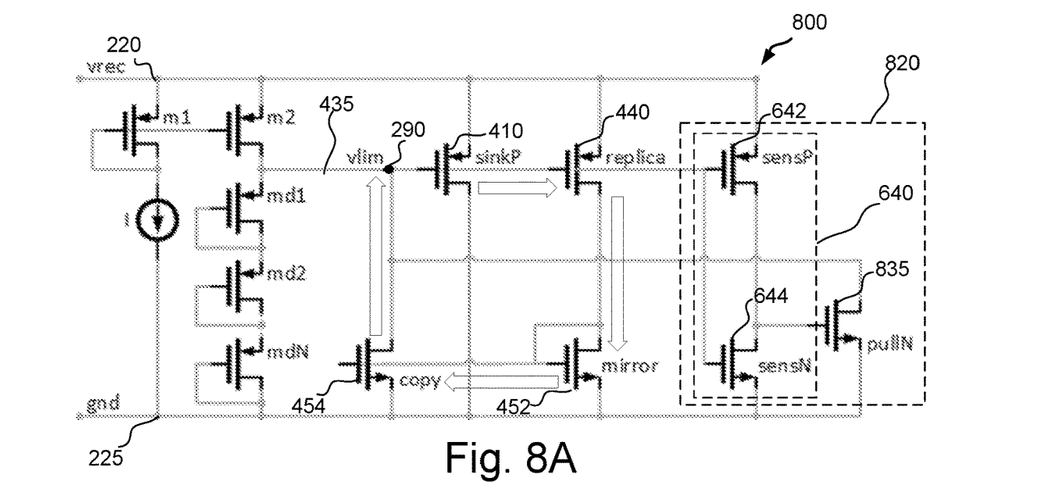
FIG. 8A schematically illustrates a circuit for a voltage limiter in accordance with a eighth example embodiment of the present disclosure.

FIG. 8A illustrates a voltage limiter 800 according to an eighth example embodiment. The voltage limiter 800 differs from the voltage limiter 400 of FIG. 4 in that the feedback circuitry further comprises a current pull device 835, in the form of an NMOS transistor, coupled between the control terminal of the current sink device 410 and ground 225. The polarity of the current pull device 835 is opposite to that of the current sink device 410. The voltage limiter 800 also includes a sensing device 640 for sensing the current through the current sink device 410, and for turning on the current pull device 835 when current flows in the main current sink device 410. Accordingly, the input of the sensing gate 640 is connected to the control terminal (gate) of the current sink device 410. The output of the sensing gate 640 is connected to the control terminal of the current pull device 835. The sensing gate may be an inverter, a Schmitt trigger, a latch, an amplifier, and/or any other simple, complex or compound gate, sequential or combinational. In the voltage limiter 800 of FIG. 8A, the sensing gate 640 is a MOS inverter comprising a PMOS transistor 642 and an NMOS transistor 644, their control terminals being coupled to the control terminal of the current sink device 410, their sources being coupled to Vrec 220 and ground 225 respectively, their drains both being coupled to the control terminal of the current pull device 835.

Figure 8B:
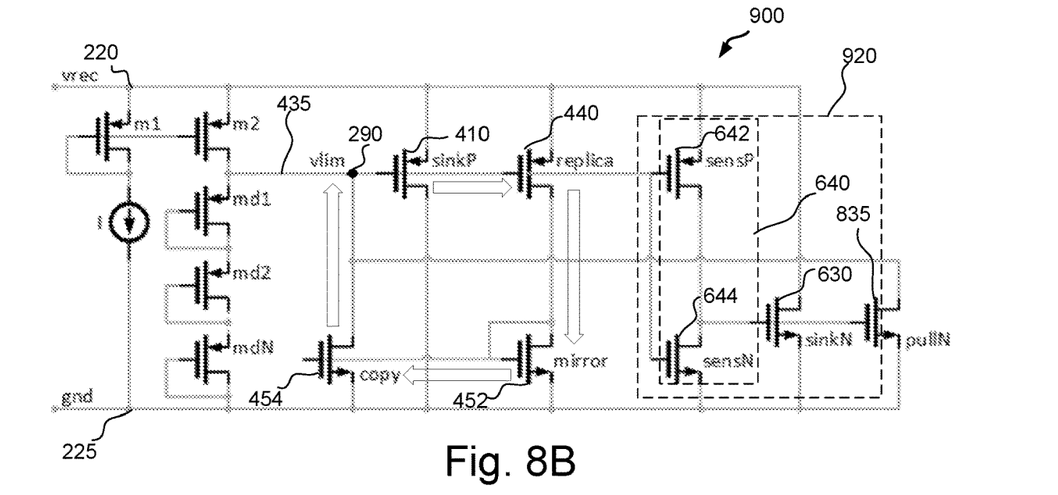
FIG. 8B illustrates a circuit for a voltage limiter in accordance with a ninth example embodiment of the present disclosure.

FIG. 8B illustrates a voltage limiter 900 according to a ninth example embodiment. The voltage limiter 900 differs from the voltage limiter 400 of FIG. 4 in that the feedback circuitry further comprises a complementary current sink device 630 as disclosed above in connection with FIGS. 6A and 6B, and a current pull device 835 as disclosed above in connection with FIG. 8A. The voltage limiter 900 includes a sensing gate 640 for sensing the current through the current sink device 410, the input of the sensing gate 640 being connected to the control terminal (gate) of the current sink device 410. The output of the sensing gate 640 is connected to the control terminals of both the complementary current sink device 630 and the current pull device 835.

Figure 9:
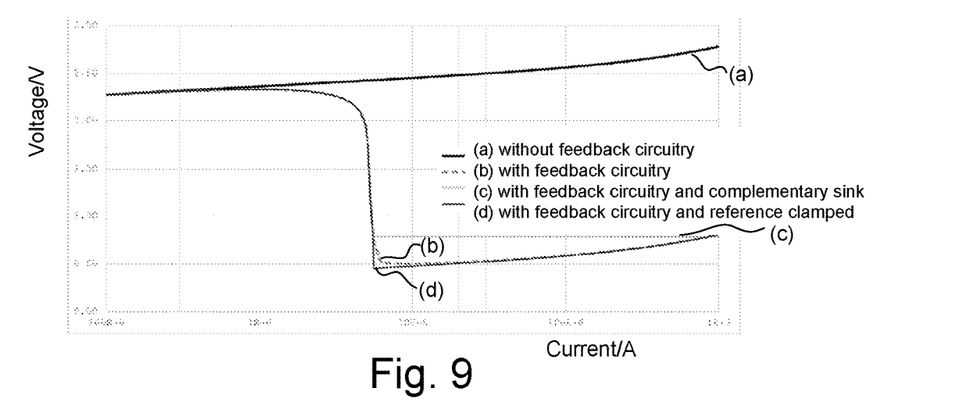
FIG. 9 shows a graph of input voltage against current sunk illustrating the behaviour of a typical voltage limiter and the voltage limiters according to the eighth and ninth example embodiments.

FIG. 9 shows a graph illustrating the behaviour of the voltage limiter 800 of FIG. 8A, compared with that of the voltage limiters 600, 700 of FIGS. 6A, 6B, the voltage limiter 400 of FIG. 4 and a typical voltage limiter 100. The upper solid line (a), dashed line (b), and lower solid line (c) are the same as those discussed above with reference to FIG. 7. The lowermost solid line (d) shows the voltage Vrec 220 as a function of the current through the current sink device 410, for the voltage limiter 800 of the eighth example embodiment described above with reference to FIG. 8A. The effect of the current pull device 830 in the voltage limiter 800 of FIG. 8A is to clamp the control terminal of the current sink device 410 so that the current sink device 410 is fully turned on, causing the voltage to reduce even more sharply (i.e. at a current of around 4E-6 A). Thus the I/V curve (d) in FIG. 9 has a sharper edge than curve (b). An advantage of this arrangement is that the current pull device 830 may be smaller than the complementary current sink device 630 of FIGS. 6A and 6B.

Figure 10:
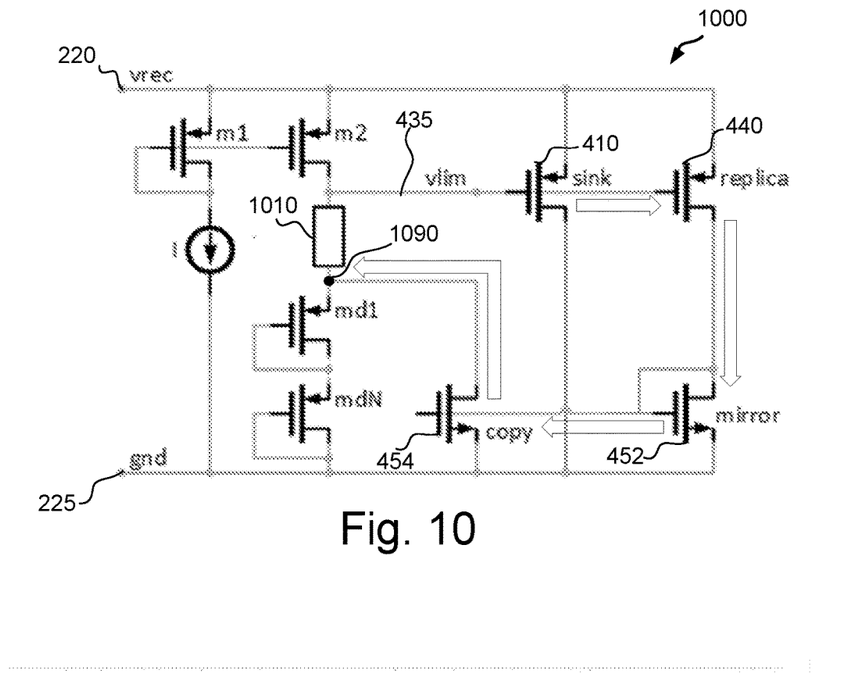
FIG. 10 illustrates a circuit for a voltage limiter in accordance with a tenth example embodiment of the present disclosure.

FIG. 10 illustrates a voltage limiter 1000 according to a tenth example embodiment. The voltage limiter 1000 differs from the voltage limiter 400 of FIG. 4 in that the feedback circuitry applies the feedback current to a feedback node 1090 at a different circuitry point. In the voltage limiter 1000, a resistor is coupled between the feedback node 1090 and the control terminal of the current sink device 410, thereby generating a voltage offset between the feedback node 1010 and the control terminal of the current sink device 410. The resistor 1010 is coupled in series between the transistor m2 and the first diode md1 of the reference generator. In other embodiments, a similar voltage drop may be achieved using a different passive or active element, for example a diode, bipolar transistor, or MOS transistor, or using a combination of elements.

Figure 11:
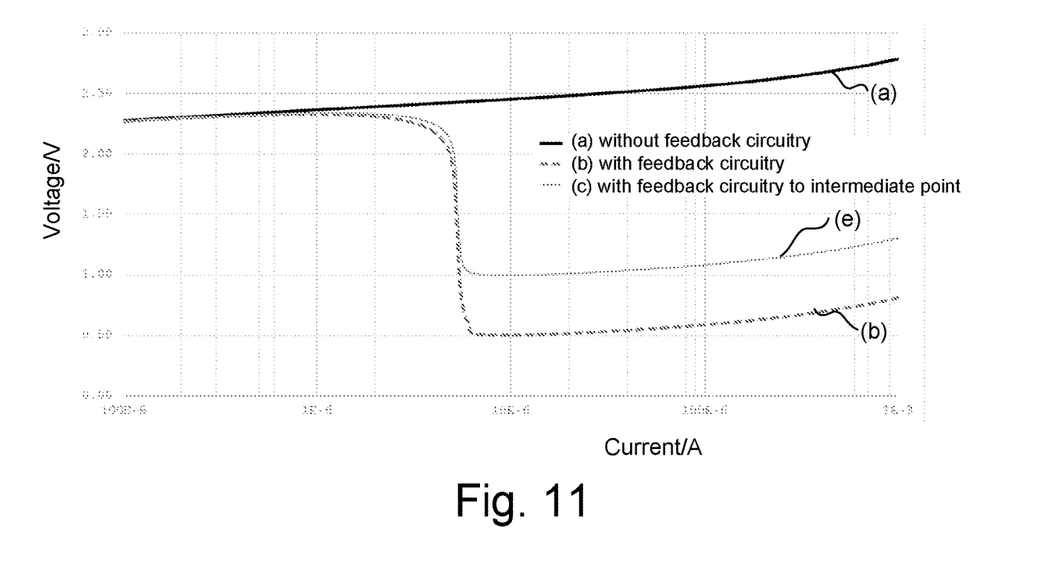
FIG. 11 shows a graph of input voltage against current sunk illustrating the behaviour of a typical voltage limiter and the voltage limiter according to the eleventh example embodiment.

FIG. 11 shows a graph illustrating the behaviour of the voltage limiter 1010 of the present disclosure, compared with that of the voltage limiter 400 of FIG. 4 and a typical voltage limiter 100. The upper solid line (a) and dashed line (b) are the same as discussed above with reference to FIG. 7. The lower solid line (e) shows the voltage Vrec 220 as a function of the current through the current sink device 410, for the voltage limiter 1000 of the tenth example embodiment described above with reference to FIG. 10. The effect of the feedback current passing through a resistor is an upward shift in the value of the reduced voltage level at high currents. Changing the location of the feedback node can therefore be used to adjust the level of the reduced voltage at high currents. For example, some applications may require all read and write operations to be disabled at high RF powers, for which the voltage must be reduced below the read threshold, while other applications may require only write operations to be disabled, for which the voltage must be reduced below the write threshold, which is generally higher (e.g. 1V) than the read threshold (e.g. 0.5V).

In the example embodiments described above, the current sink device, current replica device, current mirrors, additional current sink device and current pull device are all based on MOS transistors. The current sink device and current replica device have a first polarity. The (first) current mirror is based on transistors having a second polarity opposite to the first polarity. However, the skilled person will appreciate that other devices, in particular other types of transistor, could be used.

It will also be appreciated that all the example embodiments disclosed above may be built in their complementary form, that is be replacing NMOS devices by PMOS devices and replacing PMOS devices by NMOS devices.

Although particular example embodiments of the disclosure have been described above, it will be appreciated than many modifications, including additions and/or substitutions, may be made within the scope of the appended claims.

The invention claimed is:

1. A voltage limiter for a radio-frequency identification (RFID) integrated circuit (IC) for an RFID tag, the RFID IC including a radio-frequency (RF) rectifier, the voltage limiter comprising:
a current sink device coupled between an output of the RF rectifier and ground;
a reference generator having an output for providing a reference voltage for controlling a current through the current sink device to limit a voltage at the output of the RF rectifier to values below a predefined voltage level; and
feedback circuitry arranged to provide a feedback current to the reference generator to vary the reference voltage, the feedback current being dependent on the current through the current sink device, and wherein the feedback circuitry includes a current replica device coupled between the output of the RF rectifier and the ground, in parallel with the current sink device.

2. The voltage limiter of claim 1, wherein the feedback current is proportional to the current through the current sink device.

3. The voltage limiter of claim 1, wherein a control terminal of the current replica device is coupled to a control terminal of the current sink device.

4. The voltage limiter of claim 1, wherein the current replica device is configured to replicate a multiple or submultiple of the current through the current sink device.

5. The voltage limiter of claim 1, wherein the feedback circuitry is configured to provide the feedback current to a control terminal of the current sink device.

6. The voltage limiter of claim 1, wherein the feedback circuitry is configured to provide the feedback current to a feedback node of the reference generator, wherein a voltage offset is generated between the feedback node and a control terminal of the current sink device.

7. The voltage limiter of claim 6, wherein the feedback circuitry comprises an element coupled between the feedback node and the control terminal of the current sink device for generating the voltage offset, the element being selected from a group consisting of a resistor, a diode, a bipolar transistor, and a MOS transistor.

8. The voltage limiter of claim 1, wherein the current sink device is a transistor and comprises a control terminal coupled to the output of the reference generator.

9. The voltage limiter of claim 8, wherein the current replica device is a transistor having a same polarity as the current sink device.

10. The voltage limiter of claim 1, wherein the voltage limiter is implemented on the IC in the RFID tag.

11. A voltage limiter for a radio-frequency identification (RFID) integrated circuit (IC) for an RFID tag, the RFID IC including a radio-frequency (RF) rectifier, the voltage limiter comprising:
a current sink device coupled between an output of the RF rectifier and ground;
a reference generator having an output for providing a reference voltage for controlling a current through the current sink device to limit a voltage at the output of the RF rectifier to values below a predefined voltage level; and
feedback circuitry arranged to provide a feedback current to the reference generator to vary the reference voltage, the feedback current being dependent on the current through the current sink device, wherein the feedback circuitry includes a current replica device coupled between the output of the RF rectifier and the ground, in parallel with the current sink device, and wherein the feedback circuitry further comprises at least one current mirror for copying a current in the current replica device.

12. The voltage limiter of claim 11, wherein said at least one current mirror is configured to mirror a multiple or submultiple of the current in the current replica device.

13. The voltage limiter of claim 11, wherein said at least one current mirror comprises a first current mirror for copying the current in the current replica device, and a further current mirror for copying the current in the first current mirror.

14. A voltage limiter for a radio-frequency identification (RFID) integrated circuit (IC) for an RFID tag, the RFID IC including a radio-frequency (RF) rectifier, the voltage limiter comprising:
a current sink device coupled between an output of the RF rectifier and ground, wherein the current sink device is a main current sink device;
a reference generator having an output for providing a reference voltage for controlling a current through the main current sink device to limit a voltage at the output of the RF rectifier to values below a predefined voltage level;
feedback circuitry arranged to provide a feedback current to the reference generator to vary the reference voltage, the feedback current being dependent on the current through the main current sink device;
an additional current sink device coupled between the output of the RF rectifier and the ground, in parallel with the main current sink device; and
a sensing device for sensing the current through the main current sink device and for turning on the additional current sink device when the current in the main current sink device exceeds a predetermined level.

15. The voltage limiter of claim 14, wherein the sensing device comprises at least one device selected from a group consisting of an inverter, a Schmitt trigger, a latch, and an amplifier.

16. A voltage limiter for a radio-frequency identification (RFID) integrated circuit (IC) for an RFID tag, the RFID IC including a radio-frequency (RF) rectifier, the voltage limiter comprising:
a current sink device coupled between an output of the RF rectifier and ground;
a reference generator having an output for providing a reference voltage for controlling a current through the current sink device to limit a voltage at the output of the RF rectifier to values below a predefined voltage level;
feedback circuitry arranged to provide a feedback current to the reference generator to vary the reference voltage, the feedback current being dependent on the current through the current sink device;
a current pull device coupled between a control terminal of the current sink device and the ground; and
a sensing device for sensing the current through the current sink device and for turning on the current pull device when the current flows in the current sink device.

17. The voltage limiter of claim 16, wherein the sensing device comprises at least one of an inverter, a Schmitt trigger, a latch, and/or an amplifier.

18. A voltage limiter for a radio-frequency identification (RFID) integrated circuit (IC) for an RFID tag, the RFID IC including a radio-frequency (RF) rectifier, the voltage limiter comprising:

a current sink device coupled between an output of the RF rectifier and ground, wherein the current sink device is a main current sink device;

a reference generator having an output for providing a reference voltage for controlling a current through the main current sink device to limit a voltage at the output of the RF rectifier to values below a predefined voltage level;

feedback circuitry arranged to provide a feedback current to the reference generator to vary the reference voltage, the feedback current being dependent on the current through the main current sink device;

an additional current sink device coupled between the output of the RF rectifier and the ground, in parallel with the main current sink device;

a current pull device coupled between a control terminal of the main current sink device and the ground; and a sensing device for sensing the current through the main current sink device and for turning on the additional current sink device and the current pull device when the current flows in the main current sink device.

19. A method for operating a voltage limiter in a radio-frequency identification (RFID) integrated circuit (IC) for an RFID tag, the RFID IC including a radio-frequency (RF) rectifier, the method comprising:

sinking, by a current sink device, a current from an output of the RF rectifier to ground;

providing, by a reference generator, a reference voltage for controlling the current to limit a voltage at the output of the RF rectifier to values below a predefined voltage level; and providing, by feedback circuitry, a feedback current to vary the reference voltage, the feedback current being dependent on the current, and the feedback circuitry comprising a current replica device coupled between the output of the RF rectifier and the ground, in parallel with the current sink device.

* * * * *